United States Patent [19]
Bylund

[11] Patent Number: 4,512,689
[45] Date of Patent: Apr. 23, 1985

[54] CUTTING INSERT AND CUTTING TOOL THEREFOR

[75] Inventor: Sven O. Bylund, Sandviken, Sweden

[73] Assignee: Santrade Ltd., Lucerne, Switzerland

[21] Appl. No.: 468,939

[22] Filed: Feb. 23, 1983

[30] Foreign Application Priority Data

Apr. 1, 1982 [SE] Sweden .............................. 8202092

[51] Int. Cl.³ .................. B26D 1/12; B23P 15/28;
B23D 77/00; B27G 15/00
[52] U.S. Cl. ........................................ 407/40; 407/64;
407/103; 407/113; 408/228; 408/713
[58] Field of Search ............ 407/103, 54, 33, 36,
407/113, 40, 42, 64, 65, 115, 116; 408/713, 228

[56] References Cited

U.S. PATENT DOCUMENTS

| | | | |
|---|---|---|---|
| 3,496,618 | 2/1970 | Como | 407/103 |
| 4,072,438 | 2/1978 | Powers | 408/59 |
| 4,132,493 | 1/1979 | Hosoi | 407/53 |
| 4,169,690 | 10/1979 | Kendra | 407/90 |
| 4,271,882 | 6/1981 | Valo | 144/241 |
| 4,381,162 | 4/1983 | Hosoi | 408/1 |

FOREIGN PATENT DOCUMENTS

| | | | |
|---|---|---|---|
| 2737827 | 3/1978 | Fed. Rep. of Germany | 407/54 |
| 19381 | 2/1977 | Japan | 407/54 |

OTHER PUBLICATIONS

"Modern Machine Shop", Richard Donarski, pp. 83–88, Aug. 1981.

Primary Examiner—Francis S. Husar
Assistant Examiner—William E. Terrell
Attorney, Agent, or Firm—Burns, Doane, Swecker & Mathis

[57] ABSTRACT

A cutting insert for a cutting tool includes a cutting edge having a concave portion and a rear portion. The concave portion is disposed in the plane of one side surface of the insert and engages a workpiece in advance of the rear portion of the cutting edge. The latter extends from a radially outer end of the convex portion and has components directed radially outwardly, longitudinally rearwardly and toward the opposite side surface of the insert. The rear portion sequentially engages the workpiece to reduce the amount of vibration of the tool.

11 Claims, 7 Drawing Figures

CUTTING INSERT AND CUTTING TOOL THEREFOR

The present invention relates to a cutting insert for chip-forming machining of preferably metallic workpieces. The cutting insert has two side surfaces and is provided with at least one cutting edge having convex shape and extending along a fraction of the periphery of the one side surface. The invention further relates to a cutting tool specifically designed to be used in combination with a cutting insert according to the invention.

A cutting insert and a cutting tool of the above type are described in U.S. Pat. No. 4,132,493. For purposes of decreasing the impact load thereon it is suggested to design the cutting edge curved when seen in the longitudinal direction of the cutting tool and from the bottom thereof. Further, due to this design, the forwardmost portion of the cutting edge located adjacent to the longitudinal axis of the tool is prevented from being damaged since the cutting speed at this portion becomes higher than compared to the speed obtained if a straight cutting edge is used. However, it has been found that the forces arising on the cutting insert during the machining have a tendency to cause the insert to be jammed between the supporting surfaces provided on the cutting tool for supporting the insert. This means that difficulties do arise as to the loosening of the insert for the replacing or indexing thereof in order to get a new cutting edge in operative position. It has also been found that high vibrations do arise during machining with solely the rear portion of the cutting edge. This could be avoided by making the entire insert curved and thus also the whole extent of the cutting edge curved from the forwardmost to the rearmost portion thereof. However, such a design involves high manufacturing problems and costs.

The object of the present invention is to provide a cutting insert and a cutting tool being designed such that the insert can be easily loosened. Another object of the invention is to provide a cutting insert being designed such that as small as possible vibrations and as low as possible heat generation do arise thereon during machining and further to ensure satisfactory chip removal. These and other objects have been attained by giving the invention the characterizing features stated in the appending claims.

The invention is described in detail in the following with reference to the accompanying drawings in which one embodiment is shown by way of example. It is to be understood that this embodiment is only illustrative of the invention and that various modifications thereof may be made within the scope of the claims.

In the drawings FIG. 1 shows a side view of a cutting insert and a cutting tool according to the invention.

Figure 1:
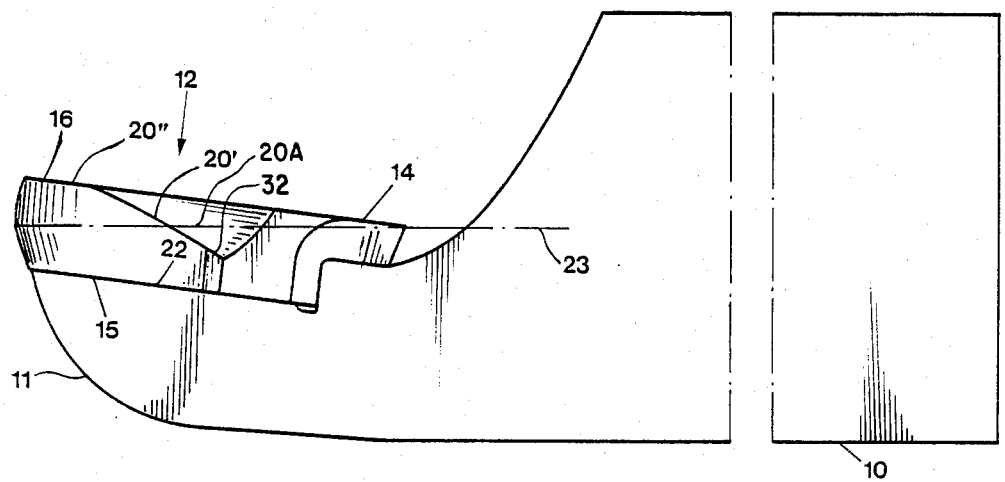
Figure 2:
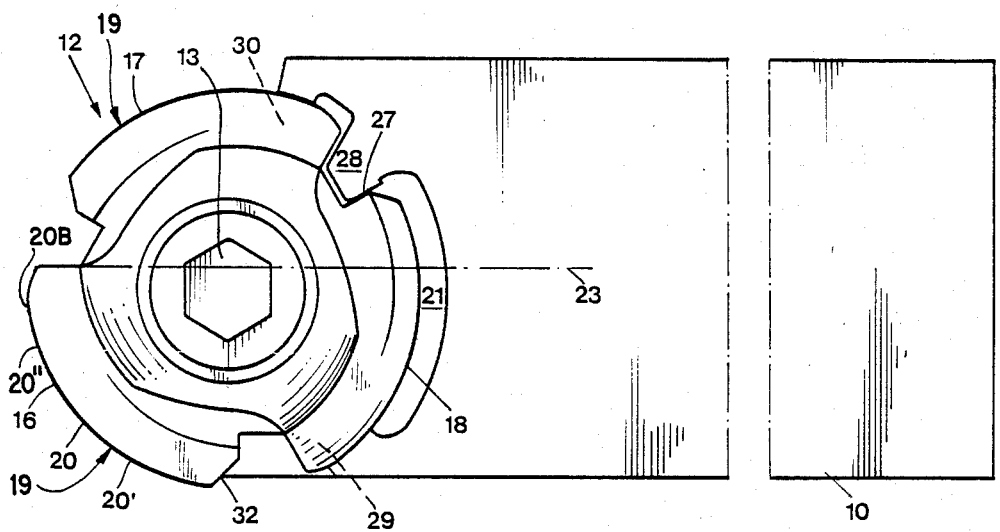
FIG. 2 shows a side view of the cutting insert and the cutting tool seen from the left in FIG. 1.
Figure 3:
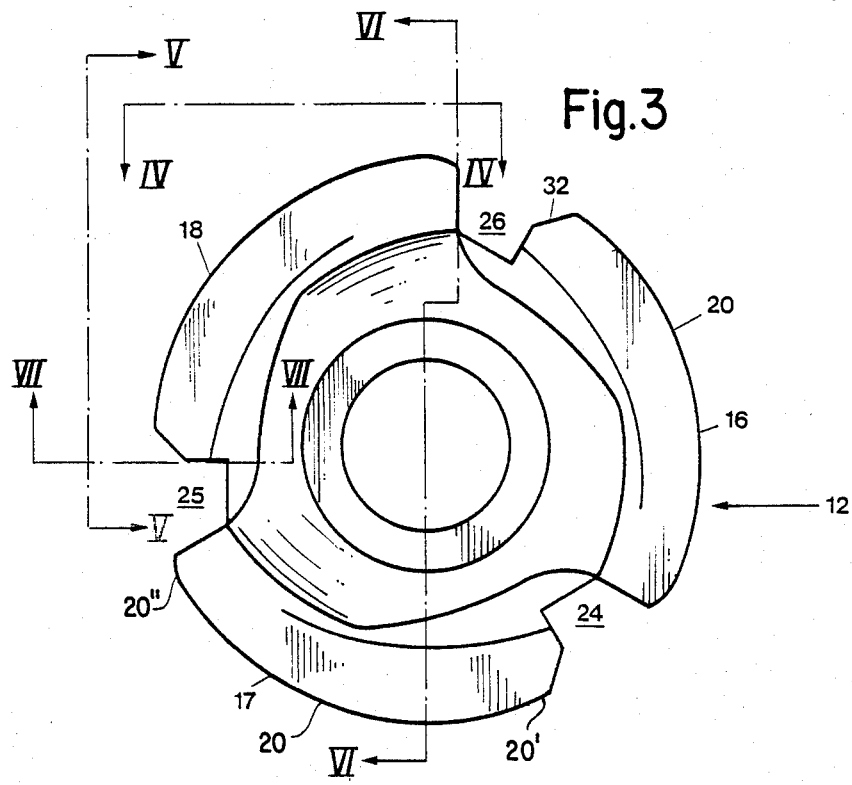
FIG. 3 shows a plan view of the cutting insert in FIGS. 1 and 2.
Figure 4:
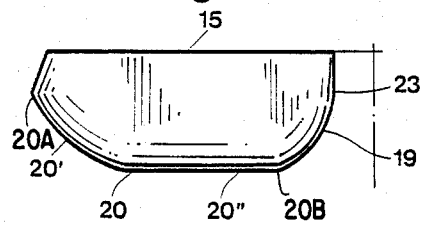
FIG. 4 is a partial front view of the cutting edge as viewed in the direction IV—IV.
Figure 5:
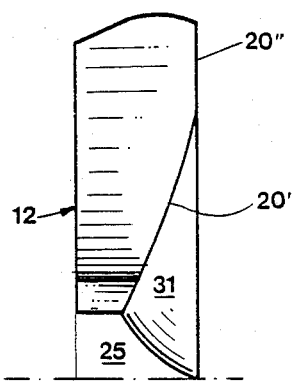
FIG. 5 is a partial side view of the insert in FIG. 3 seen on the line V—V.
Figure 6:
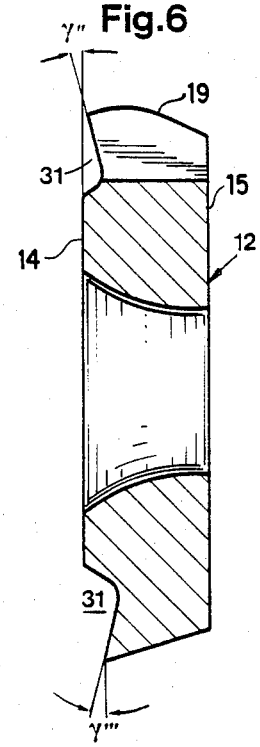
FIG. 6 shows a section through the insert in FIG. 3 taken on the line VI—VI.
Figure 7:
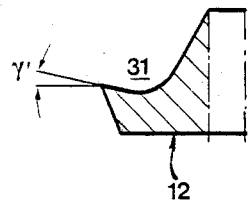
FIG. 7 shows a partial section through the insert in FIG. 3 taken on line VII—VII.

In the drawings, FIGS. 1 and 2 show an end mill body 10 having a ball-shaped end 11, to which a cutting insert 12 in a manner known per se is secured by means of a fastener 13. The cutting insert 12, which preferably is made of cemented carbide, is designed for chipforming machining of metallic workpieces. The cutting insert 12 is triangular and provided with two side surfaces 14, 15. There are three equally shaped cutting edges 16, 17, 18 along the periphery of the side surface 14 equally spaced therearound. The cutting edges 16, 17, 18 comprise a convex portion 20 having the convexity directed longitudinally forwardly generally in the plane of the side surface 14 and are bent toward the side surface 15 at their longitudinally forwardmost portion 19, thereby defining the cutting edges by a helically curved line. In U.S. Pat. No. 4,132,493 there is disclosed an end mill and a cutting insert, the cutting edge of which having basically the same shape as the cutting edges 16, 17, 18. Therefore, U.S. Pat. No. 4,132,493 is incorporated in the present description by way of reference. However, contrary to the design shown in U.S. Pat. No. 4,132,493, both the portion 20 and the portion 19 are curved along circle arcs. The tool body 10 is rotatable around its longitudinal axis 23. In the cutting end of the tool body 10 there is provided a recess 21 in which the cutting insert 12 is clamped against a supporting surface 22 by means of the fastener 13. In the clamped position the operative cutting edge 16 of the insert 12 projects beyond the tool body.

Intermediate peripheral spaces 24, 25, 26 are provided in the cutting insert 12 between two consecutive cutting edges 16, 17, 18. At the one side these spaces are limited by a supporting surface 27 provided at the rear end of the adjacent cutting edge. An abutment 28 is provided on the tool body 10 in the space 25 which is diametrically opposed to the operative cutting edge 16. The abutment 28 cooperates with the supporting surface 27 so as to prevent rotation of the insert 12 around the axis of the fastener 13.

The cooperating supporting surfaces, i.e. the supporting surface 27 and the corresponding supporting surface on the abutment 28, are directed substantially towards the centre of the fastener 13. This means that no radial relative movement might arise along these supporting surfaces. Thus, there is no risk that the insert 12 becomes jammed. When the insert 12 is to be replaced or indexed the fastener 13 can be easily loosened. There are provided another two supporting surfaces on the tool body 10 intended to cooperate with surfaces 29, 30 on the insert 12 in order to further ensure that the insert is maintained in correct angular position and prevent rotation of the insert.

According to the invention a recess 31 is provided in the side surface 14 in connection with the cutting edge 16 in such a way that the longitudinally rear portion 20' of the cutting edge 16 is nearer to the side surface 15 than the longitudinally forward portion 20" thereof. The portion 20' is located longitudinally rearwardly of the portion 20" during machining. Thus, the radially outer end 20A of the rear portion 20' is located closer to the side surface 15 than is the radially inner end 20B of the convex portion 20. Due to this design it is ensured that the different portions of the cutting edge come into contact with the workpiece sequentially after each other, more precisely in such a way that the forward portion 20" of the cutting edge 16, wholly or partially, has finished its cutting operation before the rear portion 20' of the cutting edge comes into contact with the workpiece. Due to this, no appreciable vibrations will arise which would be the case, especially during cutting with solely the radially outer portion of the cutting edge, if the entire cutting edge was lying in the plane of the side surface 14. In the preferred embodiment the cutting edge 16 progressively approaches the side surface 15 along the rear portion 20'. The portion 19 which is bent toward the side surface 15, and thus the operative cutting edge, starts in the vicinity of the longitudinal axis 23 of the tool body. As above-mentioned the varying distance of the cutting edge 16 from the side surface 15 in the longitudinal direction of the tool body 10 is created by means of the recess 31 in the side surface 14.

The recess 31, acting as a chip breaker, extends along both the portion 20' and the portion 20". In the preferred embodiment the recess 31 continues, wholly or partially, along the portion 19.

For purposes of producing as small as possible vibrations and as low as possible heat generation the insert is, according to the invention, provided with a comparatively large positive rake angle $\gamma$ at its rear portion 20'. According to the invention, further, the rake angle $\gamma$ is positive and still larger at the longitudinally forward portion 20" than at the longitudinally rear portion 20'. Preferably, the rake angles $\gamma''$ and $\gamma'$, respectively, are in respectively the order of 18° and 7°. In an intermediate portion of the cutting edge and rake angle $\gamma'''$ has a value between 7° and 18°. Due to the fact that the supporting surface 22 is inclined with respect to the longitudinal axis 23 the rake angles, when the cutting insert is mounted thereon, are larger, in the order of respectively 26° and 15°. The reason why the rake angle is larger at the forward portion 20" than at the rear portion 20' is that the forward portion of the cutting edge can be said to work as a drill and that the optimal rake angle is larger for a drill than for a milling cutter.

In the preferred embodiment an auxiliary cutting edge 32 is provided at the longitudinally rear end of the cutting edge 16. The cutting edge 32, which extends transversely relative to the cutting edge 16 and forms an obtuse angle therewith, is intended to cut the workpiece during reversed relative movement between the insert 16 and the workpiece.

In the illustrated embodiment the cutting insert is provided with three cutting edges. However, the invention, as to the shape of the cutting edge, might as well be applied on an invert having an arbitrary, for instance two, number of cutting edges.

When mounting an insert having two cutting edges on the tool body the insert is fixed against a first supporting surface which rests against a transverse surface at the rear end of the operative cutting edge, and against a second supporting surface which rests against a portion of the insert at the forward part of the non-operative cutting edge.

I claim:

1. A cutting tool for the chipforming machining of workpieces, comprising:
   a tool body rotatable in a direction of rotation about a longitudinal axis thereof, a longitudinally forward cutting end of said tool body including a recess having a support surface,
   a cutting insert mounted in said recess and including:
   first and second side surfaces spaced apart in said direction of rotation, said first side surface resting against said support surface of said recess and trailing said second side surface with reference to said direction of rotation, and
   a convex cutting edge including a forward portion and a rear portion, said forward portion lying substantially in a plane defined by said second side surface and having a radially inner end located at a forward end of said second side surface and adjacent said axis, said forward portion extending radially outwardly and longitudinally rearwardly and merging with said rear portion at a location spaced radially outwardly from said axis, said rear portion extending from said location along a path formed by components directed radially outwardly, longitudinally rearwardly, and toward said first side surface, respectively, such that a radially outer end of said rear portion is disposed longitudinally rearwardly of said radially inner end and closer to said first side surface than said radially inner end.

2. A cutting tool according to claim 1, wherein said insert has a first positive rake face along said forward portion, and a second positive rake face along said rear portion, a first rake angle defined by said first rake face being larger than a second rake angle defined by said second rake face.

3. A cutting tool according to claim 2, wherein said first rake angle is substantially 18° and said second rake angle is substantially 7°.

4. A cutting tool according to claim 1, wherein said cutting edge includes a further portion extending from said radially inner end toward said first side surface whereby said cutting edge extends generally helically.

5. A cutting tool according to claim 1, wherein said insert includes a positive rake face extending along said rear portion and defining a chipbreaking recess in said insert.

6. A cutting tool according to claim 1, said insert further including a pair of additional cutting edges formed identically to said first-named cutting edge, and said tool body further including an abutment, said cutting edges being mutually spaced to define spaces therebetween, each space being sized to receive said abutment, one of said spaces receiving said abutment being formed between two of said cutting edges while the remaining cutting edge is disposed in a cutting position.

7. A cutting insert for use with a tool body which is rotatable in a direction of rotation about a longitudinal axis thereof and which includes a recess at its longitudinally forward end, said insert comprising:
   first and second side surfaces, said first side surface being seatable in said recess such that said first side surface trails said second side surface with reference to said direction of rotation, and
   a convex cutting edge including a forward portion and a rear portion, said forward portion lying substantially in a plane defined by said second side surface and having an inner end located at a forward end of said second side surface and which defines a radially inner end of said forward portion when disposed adjacent the rotary axis of the tool body such that said forward portion extends radially outwardly and longitudinally rearwardly and merging with said rear portion at a location spaced radially outwardly from said axis, said rear portion extending from said location along a path formed by a combination of directional components directed radially outwardly, longitudinally rearwardly, and toward said first side surface respectively, such that a radially outer end of said rear portion is disposed longitudinally rearwardly of said radially inner end and closer to said first side surface than said radially inner end.

8. A cutting insert according to claim 7, wherein said insert has a first positive rake face along said forward portion, and a second positive rake face along said rear portion, a first rake angle defined by said first rake face being larger than a second rake angle defined by said second rake face.

9. A cutting insert according to claim 8, wherein said first rake angle is substantially 18° and second second rake angle is substantially 7°.

10. A cutting insert according to claim 7, wherein said cutting edge includes a further portion extending from said radially inner end toward said first side surface whereby said cutting edge extends generally helically.

11. A cutting insert according to claim 7, wherein said insert includes a positive rake face extending along said rear portion and defining a chipbreaking recess in said insert.

* * * * *